United States Patent [19]

Lower

[11] 4,281,565
[45] Aug. 4, 1981

[54] CONTROLLED START SPEED REDUCER

[75] Inventor: Jerry L. Lower, Mishawaka, Ind.

[73] Assignee: Reliance Electric Company, Mishawaka, Ind.

[21] Appl. No.: 23,098

[22] Filed: Mar. 23, 1979

[51] Int. Cl.³ .......................... F16H 3/44; F16H 1/28
[52] U.S. Cl. ...................... 74/789; 74/801; 74/802
[58] Field of Search ................ 74/410, 790, 792, 793, 74/789, 714, 752 C, 801, 802

[56] References Cited

U.S. PATENT DOCUMENTS

| | | | |
|---|---|---|---|
| 1,620,857 | 3/1927 | Ahlm | 74/789 |
| 2,901,925 | 9/1959 | Gunderson et al. | 74/789 |
| 4,047,452 | 9/1977 | Eddy | 74/752 C |
| 4,155,275 | 5/1979 | Devanney | 74/789 |
| 4,168,611 | 9/1979 | Woyton et al. | 60/DIG. 2 |
| 4,189,962 | 2/1980 | Chung | 74/802 |

Primary Examiner—C. J. Husar
Assistant Examiner—Frank McKenzie
Attorney, Agent, or Firm—Marmaduke A. Hobbs

[57] ABSTRACT

A controlled start speed reducer in which input and output shafts are axially aligned with one another in an outer housing and an inner housing is journaled in the outer housing coaxially with said shafts. A relatively small bearing is used between said inner and outer housings at one end and a relatively large bearing is disposed between said inner and outer housings at the other end. The inner housing contains a plurality of counter shafts with gears thereon connecting a pinion on the input shaft with a gear on the output shaft to transmit the torque between the two shafts. A disc brake is rigidly connected to the inner housing and rotates therewith, and a caliper head or other suitable element restrains the rotation of the disc to control the starting operation of the reducer.

10 Claims, 1 Drawing Figure

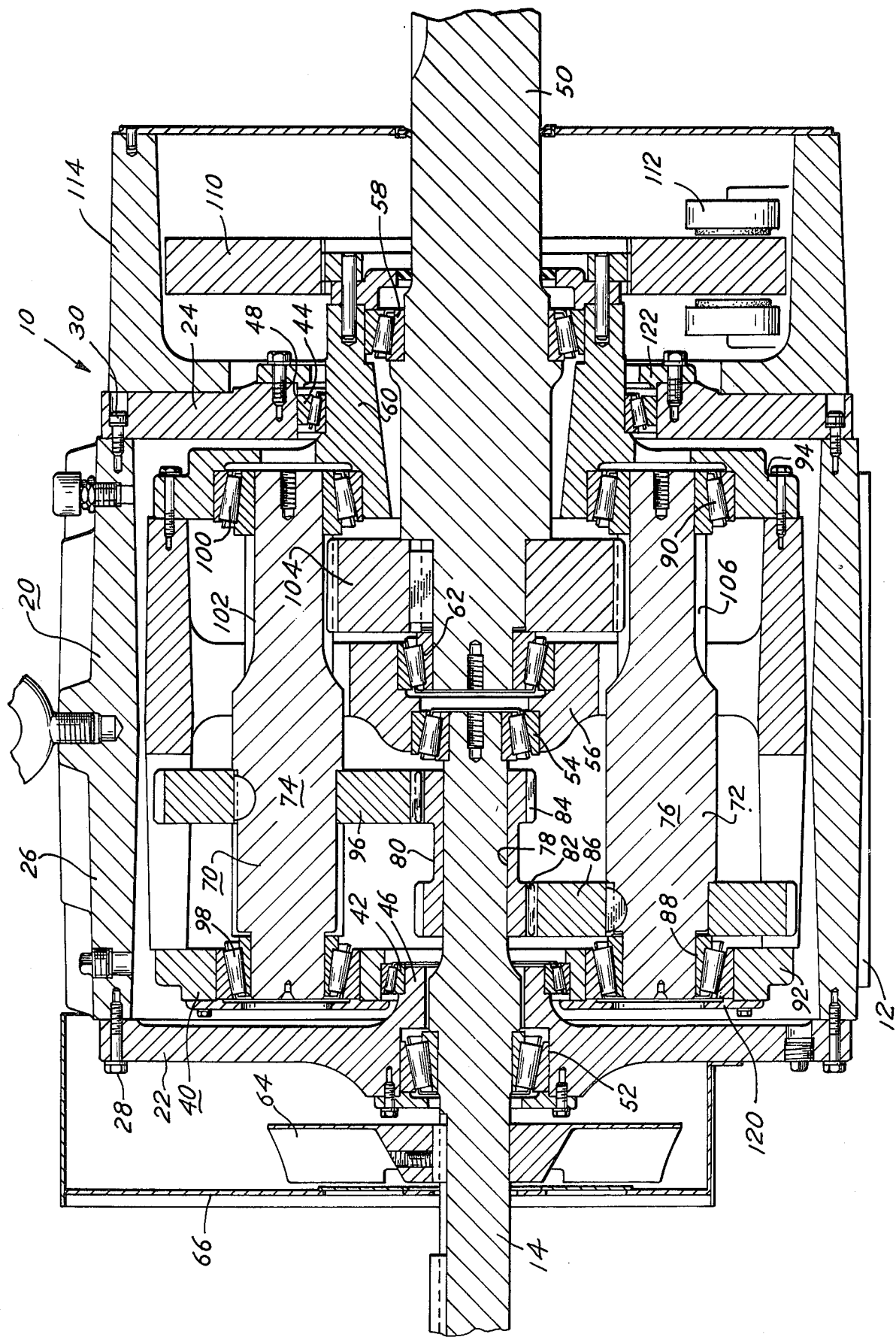

CONTROLLED START SPEED REDUCER

In mechanical power transmission systems, variably controlled acceleration is frequently necessary or desirable, and one type of controlled acceleration, referred to as a soft start, is disclosed and claimed in U.S. Pat. No. 4,047,452 and in pending patent application Ser. No. 866,286 filed Jan. 3, 1978, now U.S. Pat. No. 4,168,611, issued Sept. 25, 1979, common assignee with this application. This soft start concept has been used in conjunction with speed reducers and has been effectively accomplished in the reducers by the use of a braking mechanism for controlling a rotatable reaction shaft or other element. The soft start concept has been found especially advantageous in power drives for belt conveyors, particularly for those of large capacity. The type of equipment, such as belt conveyors, in which the foregoing concept has been utilized, is often driven by an electric motor through a speed reducer connected at the end of the driven pulley, or the motor is installed at the end of the pulley with the speed reducer mounted in the driven pulley as an integral installation. In the latter type of installation, the motor drives the speed reducer through a shaft axially disposed in the main pulley shaft, and the speed reducer reacts directly on the pulley to provide the drive torque therefor. The power drive embodying the present invention is adapted to be responsive to the load on the power output element at the time of starting to provide the required torque and effect a soft start, and thereafter to control the acceleration rate until the conveyor system has reached normal operating speed, regardless of the load on the system, thus avoiding a quick start normally involving a sudden jerk when the system is unloaded or has only a light load. Sudden starting of unloaded belt conveyors, or those with only light loads, may result in damage to the conveyor system or cause the conveyor belt to loosen to the extent that the conveyor fails or operates inefficiently. A sudden start also often damages other types of motor driven equipment, and the aforementioned soft start concept has a distinct advantage in the operation of various types of equipment other than belt conveyors. In order to meet the requirements of the various applications and installations in the soft start type speed reducer, one of the principal objects of the present invention is to provide a compact and versatile speed reducer which can be easily fabricated and assembled, and which can be conveniently serviced in the field.

Another object of the invention is to provide a speed reducer which uses all external toothed gearing and relatively small gears for the load carried thereby, and which is so constructed and designed that internal components can be more easily assembled therein and the main bearings can be of smaller size and lighter construction than in conventional or standard gear reducers of the type to which the present gear reducer relates.

Another object of the invention is to provide an acceleration and deceleration control system for mechanical power transmission equipment which is highly reliable and efficient in conservation of energy, and which can be operated for prolonged periods of time under adverse conditions without attention or adjustment by an operator once the desired rate of acceleration and deceleration has been selected for the various operating parameters and conditions.

A further object of the invention is to provide a system for controlling the acceleration and deceleration rate of a mechanical power drive which normally operates at a substantially constant speed, and which can be adapted to various applications without substantial modification in the basic system.

Still another object is to provide an acceleration and/or deceleration control system of the aforesaid type which is relatively simple in operation and construction, which can be installed and operated in limited areas and under adverse environmental conditions, and which is capable of being used in a wide variety of different applications and types of installations.

Additional objects and advantages of the present invention will become apparent from the following description and accompanying drawing, wherein the FIGURE is a vertical cross sectional view through a speed reducer embodying the present invention, showing the relationship of the input and output shafts and the gear trains interconnecting the two shafts.

Referring more specifically to the drawing, numeral 10 indicates generally a speed reducer embodying the present invention having a base 12 for mounting the reducer on a suitable rigid support. The gear reducer is driven by an electric motor or other source of power connected to input shaft 14. The gear reducer shown may be used for a variety of different applications and installations, and modifications may be made therein to adapt the reducer to a particular installation.

The gear reducer includes a stationary outer housing 20 having end walls 22 and 24 secured to opposite ends of the central portion 26 of the outer housing by a plurality of screws 28 and 30. An inner housing 40 is rotatably mounted in the outer housing on roller bearings 42 and 44, bearing 42 being mounted on an inwardly extending annular boss 46 on the inner side of end wall 22, and bearing 44 being mounted in an annular opening 48 in end wall 24. With this construction, the inner housing 40 rotates freely in the outer housing and is disposed concentrically with input shaft 14 and an output shaft 50. The input shaft is journaled in bearing 52 in end wall 22 and in bearing 54 disposed in a spider or wall 56 formed as an integral part of inner housing 40, the shaft rotating relative to both the inner and outer housings. The output shaft 50 is journaled in bearing 58 disposed in a cylindrical extension 60 formed integrally with the inner housing and in bearing 62 disposed in spider 56 in axial alignment with bearing 54 and input shaft 14. The adjacent ends of the input and output shafts are spaced from and rotate relative to one another. In order to assist in maintaining an effective operating temperature in the unit, a fan 64 is shown mounted on the input shaft for rotation therewith in shroud 66 secured to the end of housing 20.

In the embodiment of the invention illustrated in the drawing, two gear trains, indicated generally by numerals 70 and 72, including counter shafts 74 and 76, respectively, are mounted in the inner housing and interconnect the input and output shafts. The two gear trains are essentially the same in construction and operation; however, any differences between the two will be pointed out in detail hereinafter. Mounted on a splined section 78 on the inner end of input shaft 14 is a floating, dual pinion 80 having helical gears 82 and 84 thereon, gear 82 meshing with a large gear 86 mounted on shaft 76, which in turn is journaled in bearings 88 and 90 in inner housing end walls 92 and 94, respectively, of inner housing 40, and gear 84 meshing with a large gear 96 mounted on shaft 74, which in turn is journaled in bearings 98 and 100 in inner housing end walls 92 and 94.

The teeth on the two gears 82 and 84 of pinion 80 and the respective large gears are of opposite angles in order to equalize the forces transmitted from the pinion to the two gear trains 70 and 72. The pinion can slide axially in either direction on the splined section 78 of input shaft 14 to equalize the forces transmitted by the two sets of gear teeth on the gears 82 and 84 of the pinion. Mounted on or forming a part of shaft 74 is a pinion 102 which meshes with gear 104 rigidly mounted on the inner end of output shaft 50, and pinion 106 mounted on or formed integrally with shaft 76 also meshes with gear 104. Thus, the torque of input shaft 14 is transmitted through pinion 80 to gears 86 and 96 on shafts 76 and 74, respectively, and is transmitted by the shafts and pinions 102 and 106 to gear 104, and thence to the output shaft 50. While only two gear trains disposed diametrically opposite one another in inner housing 40 are illustrated in the gear reducer of the drawing, three and possibly more gear trains, equally spaced angularly around the input and output shafts, can be used.

In order to transmit the torque of input shaft 14 to output shaft 50, the inner and outer housings in combination with one another become a force reaction element in the reducer. This is accomplished by the use of a disc brake 110 mounted on cylindrical extension 60, the disc brake being controlled by one or more puck heads 112 rigidly anchored to housing 20 through housing extension 114, the heads preferably being hydraulically operated by a system not shown. When the heads are operated, the clutch is restrained in its rotation, thus causing the torque from input shaft 14 to be transmitted through the inner housing to the output shaft 50. During the acceleration, and possibly deceleration, of the speed reducer, only sufficient force is applied by the heads 112 to restrain but not stop the rotation of disc brake 110. When the speed reducer is operating at full speed, the brake and the inner housing are held stationary by the heads 112 so that the full torque applied to input shaft 14 is transmitted to output shaft 50 to power the driven equipment.

One of the primary features of the present speed reducer is its compactness and simplicity for the capacity of the unit. This is partly accomplished by the use of external gearing. Another feature which is important in obtaining this compactness and economy in fabrication is the relationship of bearings 42 and 44 between the inner and outer housings and in relationship to one another. It will be noted from the drawing that the smaller ends of the two roller bearings are facing in the same direction, thus placing the cone of bearing 42 on a shoulder or in an annular recess in annular extension 46 of end member 22 and placing the cup of the bearing against a shoulder in an annular recess in end member 92 of inner housing 40. This construction permits the use of a substantially smaller bearing than otherwise would be required, as well as reducing the size and mass of the end plate 22 near the center thereof for rotatably supporting the inner housing. The cup and cone of bearing 44 seat on end plate 24 and on a shoulder in a recess in extension 60 on end plate 94 of the inner housing. This arrangement permits the use of relatively smaller bearings than otherwise would be required for a bearing relationship at opposite ends of the rotating inner housing. The tolerance between the parts of bearing 42 is adjusted by ring 120, and the tolerance between the parts of bearing 44 is adjusted by ring 122. In view of the simplicity in the parts as a result of the relationship of these two bearings to the respective rotating elements, the reducer can be assembled with greater ease than is normally encountered in similar gear reducers, and the smaller parts result in substantial economy and simplicity over the units assembled in the conventional manner.

In the operation of the present gear reducer, the input shaft 14 is driven by an electric motor or other suitable source of power, and the torque from the shaft is transmitted through pinion 80 to gears 86 and 96 and to shafts 76 and 74, respectively. The torque of the two shafts is transmitted by pinions 102 and 106 to gear 104 mounted on the output shaft 50. When the head or heads 112 are actuated in response to the load on the equipment or by an operator, the disc brake 110 is restrained in rotation, thus restraining the rotation of inner housing 40 and the orbiting of gear trains 70 and 72 around the axis of the two shafts. This restraint causes the torque to be transmitted from the input shaft through the gear trains to the output shaft. When the unit has, at least partially, accelerated and is approaching normal operation, the brake is held fully against rotation, which in turn prevents the orbiting of the two gear trains 70 and 72, thus transmitting the full torque from the input shaft 14 to the output shaft 50.

One of the advantages of the present soft start gear reducer, in addition to the advantages mentioned herein with respect to the compactness, economy and simplicity relative to the capacity, is that the acceleration and/or deceleration can effectively be controlled automatically by the use of the disc brake 110 and the head or heads 112 in response to operating conditions. A disc brake mounted directly on the output shaft 50 may be used in order to assist in controlling the deceleration of the unit if desired.

While only one embodiment of the present controlled acceleration and deceleration speed reducer has been described in detail herein, various changes and modifications may be made without departing from the scope of the invention.

I claim:

1. A controlled start speed reducer comprising a fixed outer housing having opposite end walls, an inner housing mounted in said outer housing for rotation therein, one of said walls having an inner extending annular boss with a center hole and the other of said walls having a center opening of a diameter larger than said annular boss, an extension rigidly connecting said inner housing and projecting through said opening, a bearing means on said annular boss on which one end of said inner housing is journaled, bearing means between said extension and the respective end wall in said opening on which the other end of said inner housing is journaled, input and output shafts in axial alignment extending axially into said inner housing, a plurality of gear trains mounted for rotation in said inner housing interconnecting said input and output shafts, a disc connected to said extension for rotation therewith, and means connected to said outer housing for restraining the rotation of said disc such that said inner and outer housings function as torque reaction elements during normal acceleration and full operation of the reducer.

2. A controlled start speed reducer as defined in claim 1 in which said input shaft extends through the hole in said boss and said extension has a center hole therein and said output shaft extends through said hole.

3. A controlled start speed reducer as defined in claim 2 in which said shafts are disposed in an end to end relationship and said inner housing has a spider disposed near the longitudinal center thereof and bearing means is disposed in said spider for journaling said input and output shafts in said spider.

4. A controlled start speed reducer as defined in claim 1 in which said input shaft includes a pinion, and each of said gear trains includes a counter shaft journaled in said inner housing and a gear on the shaft meshing with said pinion.

5. A controlled start speed reducer as defined in claim 3 in which said input shaft includes a pinion, and each of said gear trains includes a counter shaft journaled in said inner housing and a gear on the shaft meshing with said pinion.

6. A controlled start speed reducer as defined in claim 4 in which said pinion has two sets of teeth and the gear on one of said counter shafts meshes with one of said sets of teeth and the gear on the other of said counter shafts meshes with the other set of teeth on said pinion.

7. A controlled start speed reducer as defined in claim 5 in which said pinion has two sets of teeth and the gear on one of said counter shafts meshes with one of said sets of teeth and the gear on the other of said counter shafts meshes with the other set of teeth of said pinion.

8. A controlled start speed reducer as defined in claim 7 in which each of said counter shafts has a pinion thereon, and a gear is mounted on said output shaft meshing with the pinions on said counter shafts.

9. A controlled start speed reducer as defined in claim 1 in which said means for restraining the rotation of said disc consists of a caliper head rigidly connected to said outer housing.

10. A controlled start speed reducer as defined in claim 8 in which said means for restraining the rotation of said disc consists of a caliper head rigidly connected to said outer housing.

* * * * *

UNITED STATES PATENT AND TRADEMARK OFFICE
CERTIFICATE OF CORRECTION

PATENT NO. : 4,281,565
DATED : August 4, 1981
INVENTOR(S) : Jerry L. Lower

It is certified that error appears in the above-identified patent and that said Letters Patent are hereby corrected as shown below:

Column 4, line 47, change "connecting" to --- connected to ---.

Signed and Sealed this

Twenty-ninth Day of June 1982

[SEAL]

Attest:

GERALD J. MOSSINGHOFF

Attesting Officer

Commissioner of Patents and Trademarks